United States Patent
Stubenrauch et al.

(10) Patent No.: US 7,543,499 B2
(45) Date of Patent: Jun. 9, 2009

(54) VIBRATION DETECTION DEVICE FOR ATTACHMENT TO A WHEEL AND WHEEL WITH SUCH A DEVICE

(75) Inventors: Arno Stubenrauch, Aidhausen (DE); Jens Graf, Schweinfurt (DE); Christian Knoche, Schweinfurt (DE); Hendrik Anne Mol, Sleeuwijk (NL); Russell Bugden, Whitmore Lake, MI (US)

(73) Assignee: AB SKF, Gothenburg (SE)

( * ) Notice: Subject to any disclaimer, the term of this patent is extended or adjusted under 35 U.S.C. 154(b) by 172 days.

(21) Appl. No.: 11/079,117

(22) Filed: Mar. 15, 2005

(65) Prior Publication Data

US 2006/0081049 A1    Apr. 20, 2006

(30) Foreign Application Priority Data

Mar. 15, 2004   (DE) .................. 10 2004 012 770

(51) Int. Cl.
*G01M 7/02* (2006.01)
(52) U.S. Cl. .......................... 73/593; 736/660
(58) Field of Classification Search ............... 73/593, 73/660; 340/682, 683
See application file for complete search history.

(56) References Cited

U.S. PATENT DOCUMENTS

| | | | | |
|---|---|---|---|---|
| 5,061,917 A | * | 10/1991 | Higgs et al. | 340/539.22 |
| 5,677,488 A | * | 10/1997 | Monahan et al. | 73/593 |
| 6,002,248 A | | 12/1999 | Binder | |
| 6,672,681 B1 | | 1/2004 | Moretti et al. | |
| 6,894,484 B2 | * | 5/2005 | Takizawa et al. | 324/174 |
| 2001/0030466 A1 | * | 10/2001 | Ehrlich et al. | 303/191 |
| 2002/0196136 A1 | * | 12/2002 | Gagnon | 340/438 |
| 2003/0019303 A1 | | 1/2003 | Dobler et al. | |
| 2003/0110860 A1 | * | 6/2003 | Okada | 73/593 |
| 2004/0102880 A1 | * | 5/2004 | Brown | 73/660 |

FOREIGN PATENT DOCUMENTS

| | | |
|---|---|---|
| DE | 195 22 543 A1 | 2/1996 |
| DE | 196 12 825 C2 | 10/1997 |
| DE | 197 03 832 A1 | 8/1998 |
| DE | 298 11 208 U1 | 11/1998 |
| DE | 198 26 422 C2 | 12/1999 |
| DE | 200 18 414 U1 | 2/2001 |
| DE | 100 31 918 A1 | 1/2002 |
| DE | 101 02 236 A1 | 8/2002 |
| DE | 101 02 650 A1 | 8/2002 |
| DE | 102 57 739 A1 | 8/2003 |
| JP | 2003-232674 | 8/2003 |
| JP | 2004347401 A * | 12/2004 |

* cited by examiner

*Primary Examiner*—Hezron Williams
*Assistant Examiner*—Nashmiya S Fayyaz
(74) *Attorney, Agent, or Firm*—Buchanan Ingersoll & Rooney, PC

(57) ABSTRACT

A device for attachment to a motor vehicle wheel includes an arrangement which, during movement or driving of the motor vehicle, detects vibrations which occur, evaluates the vibrations for an incipient fault state of a wheel bearing of the vehicle wheel, and delivers a signal when the monitoring or evaluation yields or indicates the incipient fault state.

26 Claims, 2 Drawing Sheets

VIBRATION DETECTION DEVICE FOR ATTACHMENT TO A WHEEL AND WHEEL WITH SUCH A DEVICE

This application is based on and claims priority under 35 U.S.C. §119 with respect to German Application No. 10 2004 010 770.0 filed on Mar. 15, 2004, the entire disclosure of which is incorporated herein by reference.

FIELD OF THE INVENTION

The invention generally relates to a device for attachment to a wheel. More particularly, the invention pertains to a device for attachment to a vehicle wheel to, for example, monitor a state of a wheel bearing.

BACKGROUND DISCUSSION

JP 2003-232674 discloses one example of a sensor for detecting vibrations produced by a roller bearing. A diagnostic device determines abnormalities caused by bearing damage based on evaluation of the frequencies of the vibrations.

U.S. Pat. No. 6,672,681 discloses a vibration-detecting sensor on a railway wheel unit. Output signals are transmitted to a processing unit which is located on board the railway car or the train to signal an incipient fault and/or damage state of the wheel unit.

SUMMARY

According to one aspect of the invention, a device is made for attachment to a wheel of a motor vehicle, wherein the wheel comprises a wheel bearing and the device comprises means which when driving a motor vehicle detects vibrations which occur in doing so, which evaluate the vibrations for an incipient fault state of the wheel bearing, and which deliver a signal in case the evaluation or monitoring indicates an incipient fault state.

Because the device includes means for detecting, evaluating and signaling as a relatively structurally compact unit, the device can be generally easily retrofitted by locating the device, for example, between two wheel lugs and the wheel rim, with the device being attached by tightening the wheel lugs. Since signal output, for example in the form of an optical signal originating from a light emitting diode, is a component of the structural unit of the device, signal transmission to a location different from the wheel, for example to a center console, is superfluous. Thus the device is also quite economical as a result of its concept, by which it is also possible with regard to cost aspects to advantageously provide more than one wheel (e.g., each wheel) of a motor vehicle with the indicated device.

Furthermore, one advantageous configuration in which the device is not attached directly to the wheel bearing, but is attached for example to the wheel rim, is based on the finding that an incipient fault state of the wheel bearing can also be relatively reliably inferred in vibration detection at this point.

Another aspect involves a vehicle wheel of a motor vehicle to which is attached a device, wherein the wheel comprises a wheel bearing and the device comprises means for detecting vibrations which occur during driving of the motor vehicle, for evaluating the vibrations for an incipient fault state of the wheel bearing and for delivering a signal when the evaluation indicates the incipient fault state.

According to another aspect, a method of monitoring a wheel bearing of a motor vehicle wheel comprises detecting vibrations of the wheel occurring during driving of the motor vehicle, evaluating the vibrations for an incipient fault state of the wheel bearing, and providing a signal when the evaluation indicates the incipient fault state of the wheel bearing.

BRIEF DESCRIPTION OF THE DRAWING FIGURES

These and other features and details of the disclosed subject matter will become more apparent from the following detailed discussion considered together with the accompanying drawing figures in which like elements are designated by like reference numerals.

DETAILED DESCRIPTION

Figure 1:
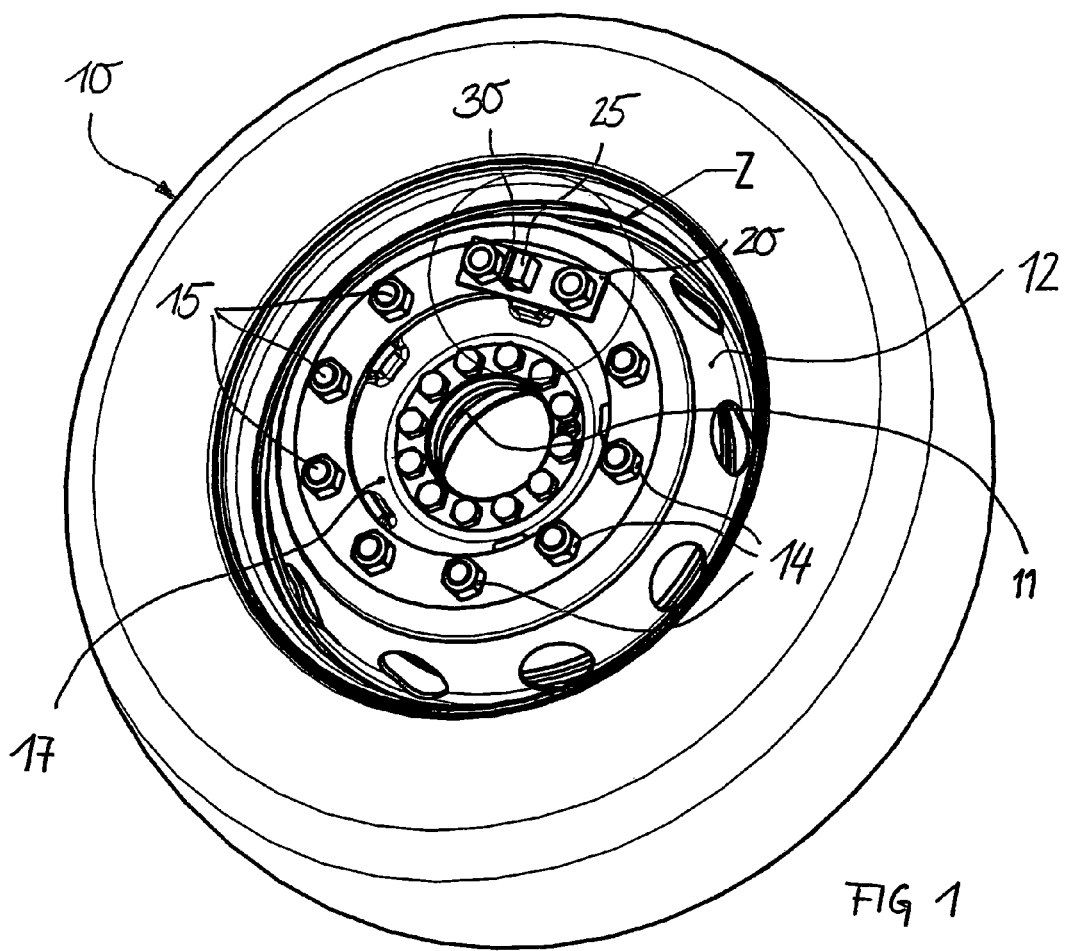
FIG. 1 is a perspective view of a wheel of a motor vehicle in which a device according to one aspect of the present invention is mounted on the wheel.

FIG. 1 illustrates one embodiment of the invention in which a device is mounted on a wheel 10 of a motor vehicle, for example a truck. A corresponding or similar device may be mounted on more than one of the wheels of the motor vehicle, and may be mounted on each wheel 10 of the motor vehicle. As generally shown in FIG. 1, the wheel includes a number of threaded bolts 15 which are mounted at the wheel bearing flange 17 which supports the rim 12 of the wheel 10.

Figure 2:
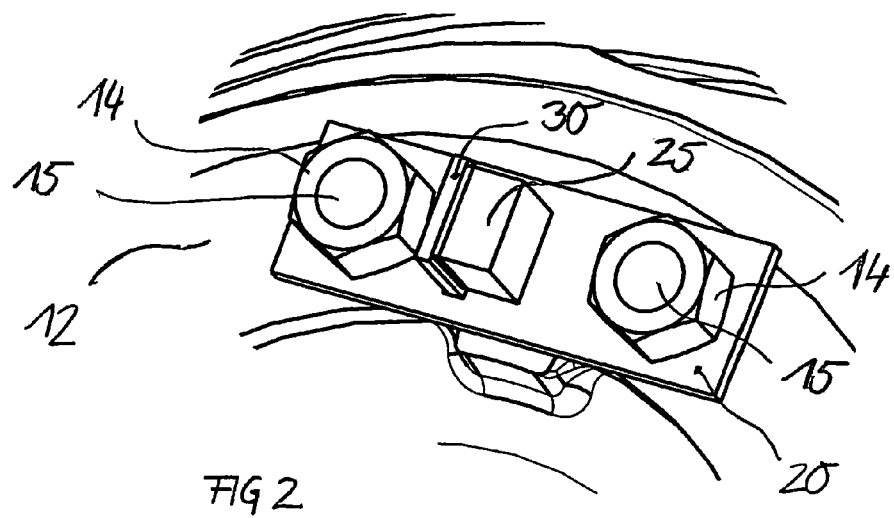
FIG. 2 is an enlarged perspective view of the circled portion of the vehicle wheel shown in FIG. 1 identified as Z.

Referring to the enlarged illustration in FIG. 2, the device comprises a support 20 possessing two holes. The center-to-center distance of the two holes corresponds, or is equal, to the center-to-center distance of two of the threaded bolts 15 which are located adjacent one another. The diameter of each of the holes in the support 20 corresponds roughly to the diameter of each of the threaded bolts 15. In the mounted state, the two adjacent threaded bolts 15 project through the two holes of the support 20. The support 20 is arranged between the rim 12 and the wheel lugs 14, and is securely connected to the wheel 10 by the corresponding tightening of the wheel lugs 14. In another embodiment, the support 20 can of course also be attached via tire bolts which can be screwed securely in the corresponding threaded holes of the wheel bearing flange which supports the rim 12.

The device also comprises an electronic unit 30 and a battery 25. The battery 25 is connected to the electronic unit 30 and supplies the electronic unit 30 with electricity. In one embodiment, the battery can be in the form of a lithium battery.

Figure 3:
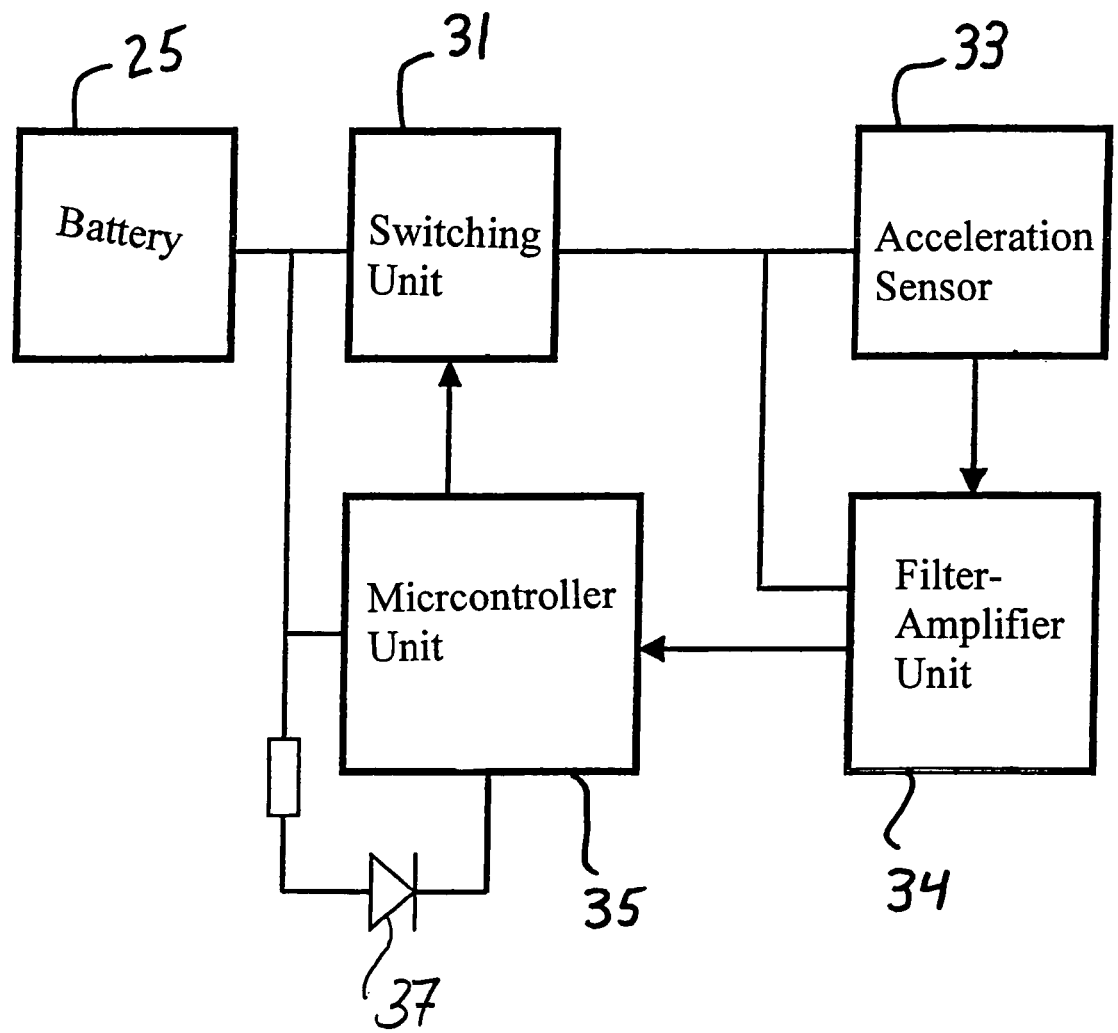
FIG. 3 is a schematic circuit arrangement of the device shown in FIG. 1.

FIG. 3 schematically illustrates a circuit arrangement of the device, with the signal connections shown by lines with arrows and the power supply connections shown by lines without arrows.

The electronic unit 30 comprises essentially a switching unit 31, an acceleration sensor 33, a filter-amplifier unit 34, a microcontroller unit 35 and a light emitting diode 37. The microcontroller unit 35 is wired permanently to the battery for being continuously supplied with electricity. Conversely, the acceleration sensor 33 and/or the filter-amplifier unit 34, which is connected downstream of the acceleration sensor 33, are connected to the battery 25, or separated from the battery, via the switching unit 31 which is controlled by the microcontroller unit 35, for example comprising a p-channel transistor according to the input of the microcontroller unit 35. In this way the acceleration sensor 33 and/or the filter-amplifier unit 34 load the battery 25 only when necessary, by which the use of the battery 25 is advantageously saved and its service life is increased. On the other hand, to ensure the warning function of the device, it is sufficient for the acceleration sensor 33 and/or the filter-amplifier unit 34 to be activated only at definable time intervals.

Because the acceleration sensor 33 is mounted securely on a circuit board of the electronic unit 30 which in turn is securely connected to the support 20, and the support 20 is in turn securely connected to the wheel 10, the vibrations which occur on the wheel 10, or in other words the solid-borne noise which occurs on the wheel 10, can be picked up or sensed by the acceleration sensor 33. The output signal of the acceleration sensor 33 which represents the vibrations is supplied to the microcontroller unit 35 via the filter-amplifier unit 34. The filter-amplifier unit 34 comprises a first stage and a second stage. Here, the first stage may be made as a bandpass filter such that before amplification of the output signal of the acceleration sensor 33, the first stage reduces its noise and filters out the DC voltage offset. The second stage comprises a series arrangement of a highpass filter, followed by an amplifier and a following lowpass filter.

The output signal of the filter-amplifier unit 34 is supplied to the microcontroller unit 35. The microcontroller unit 35 is programmed such that the signal which is supplied to it and which represents the vibrations of the wheel 10, and thus also the vibrations of the wheel bearing 11, is evaluated or monitored. The evaluation or monitoring occurs to determine whether the greased roller bearing of the wheel bearing 11 is in the proper state or whether failure of the bearing is threatened. The finding here is important in that with a long enough time interval before complete failure, the threatening failure of the roller bearing is announced by virtue of significant changes in the vibration behavior of the wheel bearing 11. If the microcontroller unit 35 identifies such a change, the microcontroller unit 35 closes a light emitting diode circuit such that the light emitting diode 37 is continuously lit or blinks. In doing so, the light emitting diode 37 in one embodiment lights until the battery 25 is discharged. The driver of the motor vehicle who monitors the wheels of the motor vehicle at regular time intervals is thus reliably warned that failure of the roller bearing, which in the worst case could result in the entire wheel 10 rolling off, could be incipient so that a visit to the nearest vehicle repair shop is warranted or required.

The device described here is able to monitor an arrangement of wheel bearings and is capable of being relatively easily retrofitted. The device includes an arrangement which, upon driving of the motor vehicle, detects vibrations which occur, evaluates the vibrations for an incipient fault state of the wheel bearing, and delivers a signal in the case in which monitoring yields the incipient fault state.

Because the device comprises means for detecting, evaluating and signaling as a relatively structurally compact unit, the device can be easily retrofitted by its being located for example simply between two wheel lugs and the wheel rim and is attached by tightening the wheel lugs. Because the signal output, for example in the form of an optical signal originating from a light emitting diode, is a component of the structural unit of the device, signal transmission to a location different from the wheel, for example to a center console, is superfluous and not required. Thus the device is also relatively economical as a result of its concept, by which it is also possible with regard to cost aspect to advantageously provide each wheel of a motor vehicle with the indicated device.

Furthermore, the advantageous configuration in which the device is not attached directly to the wheel bearing, but as was described above, for example to the wheel rim, is based on the finding that an incipient fault state of the wheel bearing can also be reliably inferred in vibration detection at this point.

The principles, preferred embodiment and mode of operation have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle wheel of a motor vehicle to which is attached a device, the wheel comprising a rim, a wheel bearing, and a plurality of lugs threadably engaged with threaded bolts so that the lugs are located on an outwardly facing side of the rim, and the device comprising a support mounted to the wheel of the motor vehicle, means provided on said support for detecting vibrations which occur during driving of the motor vehicle and for evaluating the vibrations for an incipient fault state of the wheel bearing, and a visual indicator outside the vehicle which provides a visible signal of the incipient fault state when the evaluation indicates the incipient fault state, the device being mounted on the outwardly facing side of the rim, the support being provided with at least one hole that receives one of the threaded bolts for mounting the device to the vehicle wheel.

2. The vehicle wheel according to claim 1, wherein the means comprises an acceleration sensor which detects the vibrations.

3. The vehicle wheel according to claim 1, wherein the means comprises a microcontroller unit which evaluates the vibrations for the incipient fault state of the wheel bearing.

4. The vehicle wheel according to claim 1, wherein the visual indicator comprises a light emitting diode which provides the signal when the evaluation indicates the incipient fault state of the wheel bearing.

5. A device adapted to be attached to a wheel of a motor vehicle which comprises a wheel bearing, the device comprising a support adapted to be mounted to the wheel of the motor vehicle, means provided on said support for detecting vibrations which occur during driving of the motor vehicle and for evaluating the vibrations for an incipient fault state of the wheel bearing, and a visual indicator directly on the support which provides a visual signal of the incipient fault state when the evaluation indicates the incipient fault state, the support being provided with at least one hole adapted to receive a threaded bolt of the wheel for mounting the device to the wheel of the motor vehicle.

6. The device according to claim 5, wherein the support is adapted to be attached to a rim of the wheel.

7. A device adapted to be attached to a wheel of a motor vehicle which comprises a wheel bearing, the device comprising a support adapted to be mounted to the wheel of the motor vehicle, means provided on said support for detecting vibrations which occur during driving of the motor vehicle and for evaluating the vibrations for an incipient fault state of the wheel bearing, and a visual indicator directly on the support which provides a visual signal of the incipient fault state when the evaluation indicates the incipient fault state, wherein the support is configured for attachment between two adjacent wheel lugs or tire bolts of the vehicle wheel.

8. The device according to claim 7, wherein the support comprises two holes which are made and arranged such that the two tire bolts which belong to the wheel lugs pass through the holes.

9. The device according to claim 5, wherein the support comprises two spaced apart holes adapted to receive respective threaded bolts, said visual indicator being positioned between said two spaced apart holes.

10. The device according to claim 5, wherein the visual indicator is visible from exterior of the motor vehicle.

11. The device according to claim 5, wherein the visual indicator delivers an optical signal.

12. The device according to claim 5, wherein the visual indicator comprises a light emitting diode.

13. The device according to claim 5, wherein the means for detecting vibrations comprise an acceleration sensor.

14. The device according to claim 5, wherein the means for evaluating comprises a filter-amplifier unit.

15. The device according to claim 14, wherein an output signal of the means for detecting vibrations is sent to the filter-amplifier unit.

16. The device according to claim 14, wherein the filter-amplifier unit comprises a first stage and a second stage connected downstream of the first stage.

17. The device according to claim 16, wherein the first stage is made as a band pass filter for reducing noise and filtering out DC voltage offset.

18. The device according to claim 16, wherein the second stage comprises a series connection of a highpass filter, an amplifier and a lowpass filter.

19. The device according to claim 14, wherein the means for evaluating comprises a microcontroller unit.

20. The device according to claim 19, wherein an output signal of the filter-amplifier unit is supplied to the microcontroller unit as an input signal.

21. The device according to claim 5, further comprising a battery on the support.

22. The device according to claim 21, wherein the battery is a lithium battery.

23. The device according to claim 21, wherein the means for evaluating comprises a microcontroller unit, and the battery is permanently connected to the microcontroller unit for supplying the microcontroller unit with electricity.

24. The device according to claim 5, wherein the means for detecting vibrations comprises an acceleration sensor and the means for evaluating comprises a filter-amplifier unit, and wherein at least one of the acceleration sensor and the filter-amplifier unit is switchably connected to the battery via a switching unit to be supplied with electricity.

25. The device according to claim 24, wherein the switching unit is connected to the microcontroller unit such that switching is controlled by the microcontroller unit.

26. The vehicle wheel according to claim 1, wherein the device comprising the support is provided with two spaced apart through holes, and wherein the wheel comprises a wheel bearing flange from which extends two of the threaded bolts, the threaded bolts each passing through one of the through holes in the support.

* * * * *